United States Patent
Flemming et al.

(10) Patent No.: US 8,234,597 B2
(45) Date of Patent: Jul. 31, 2012

(54) TOOL AND METHOD TO GRAPHICALLY CORRELATE PROCESS AND TEST DATA WITH SPECIFIC CHIPS ON A WAFER

(75) Inventors: Mark J. Flemming, Essex Junction, VT (US); Alexander J. Franz, Westford, VT (US); Tyler D. Kieft, Essex Junction, VT (US); Raghav Kohli, Essex Junction, VT (US); Karl V. Swanke, Essex Junction, VT (US); Matthew S. Turnbull, Essex Junction, VT (US); Matthew Walker, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 1177 days.

(21) Appl. No.: 12/013,533

(22) Filed: Jan. 14, 2008

(65) Prior Publication Data

US 2009/0183133 A1    Jul. 16, 2009

(51) Int. Cl.
*G06F 17/50* (2006.01)
(52) U.S. Cl. .......................... 716/51; 716/50
(58) Field of Classification Search .............. 716/50, 716/51
See application file for complete search history.

(56) References Cited

U.S. PATENT DOCUMENTS

| | | | |
|---|---|---|---|
| 3,842,491 A | 10/1974 | Depuy et al. | |
| 6,133,582 A | 10/2000 | Osann, Jr. et al. | |
| 6,362,013 B1 | 3/2002 | Yoshimura | |
| 6,931,580 B1 | 8/2005 | Barcomb et al. | |
| 7,207,017 B1* | 4/2007 | Tabery et al. | 716/52 |
| 7,241,635 B1 | 7/2007 | Osann | |
| 2005/0060212 A1* | 3/2005 | Annamaneni et al. | 705/7 |
| 2005/0130333 A1 | 6/2005 | Zhong et al. | |
| 2005/0256602 A1* | 11/2005 | Tsao et al. | 700/121 |
| 2006/0010416 A1* | 1/2006 | Keck et al. | 716/19 |
| 2006/0026549 A1* | 2/2006 | Tsao et al. | 716/19 |
| 2006/0074506 A1* | 4/2006 | Braun et al. | 700/96 |
| 2007/0105245 A1 | 5/2007 | Funakoshi et al. | |
| 2009/0162760 A1* | 6/2009 | Hoshino et al. | 430/30 |

OTHER PUBLICATIONS

Kahng et al.; "Multi-Project Reticle Floorplanning and Wafer Dicing"; Apr. 18, 2004; CSE Department, UC San Diego; pp. 1-8.*
Gyvex, J. Pineda de; "Always: A System for Wafer Yield Analysis"; Feb. 1988; EUT Report 88-E-189; pp. 1-54.*

* cited by examiner

*Primary Examiner* — Suresh Memula
(74) *Attorney, Agent, or Firm* — Richard Kotulak; Roberts Mlotkowski Safran & Cole, P.C.

(57) ABSTRACT

A tool and method is provided to graphically correlate process and test data with specific chips on a multi-project wafer. The tool and method is configured and implemented to select certain sites and export these sites to an industry standard map that can be used in a variety of chip picking or test tools. In one embodiment, the method includes importing a wafer floor plan with chips of different design parameters and importing manufacturing logistical information of the chips. The method further includes graphically rendering each chip on the wafer to scale within a unit cell using the imported wafer floor plan and the manufacturing logistical information.

26 Claims, 8 Drawing Sheets

TOOL AND METHOD TO GRAPHICALLY CORRELATE PROCESS AND TEST DATA WITH SPECIFIC CHIPS ON A WAFER

FIELD OF THE INVENTION

The invention relates to a tool and method to graphically correlate process and test data with specific chips on a wafer in multi-project wafer designs, and mapping and correlating chip data.

BACKGROUND DESCRIPTION

The rising costs of creating a mask set, combined with customers wishing to manufacture low-volume designs, has led the semiconductor industry to introduce the multi-project wafer. The multi-project wafer allows multiple companies' IP or individual companies with multiple IP to reside on the same reticle (unit cell), enabling these companies to share the costs of production while maintaining acceptable yields. With mask costs constantly increasing, it has also become increasingly popular to prototype designs using multi-project wafer runs.

Adding a multi-project wafer methodology to a fabrication facility that is only set up to handle single-project wafers is a complex process. For example, floor plan design and wafer dicing, once simple, becomes a process requiring much thought and planning, to make sure that the die (also referred to as discrete chip or chips) are properly aligned and that no chips are destroyed when making multiple dicing passes of different-size chips. In addition, many of the software and hardware tools used in the process remain set up to handle only single-project wafers, and must be "customized" into dealing with multi-project wafers. The picking tool, for instance, can only pick one chip type on each picking pass.

At the same time, complexity within the multi-project wafer has been rapidly increasing. Typical multi-project wafers can have anywhere from 2 to 30+ unique chips (i.e., IP and sometime size) within a single reticle. This has made it difficult to process multi-project wafers, not only for obvious technical reasons, but also because care must be taken to protect each customer's IP (that is, each customer is only allowed to see yield/process data for their chips).

Another contributing factor to the difficulty in processing multi-project wafers is that the costs to the service provider have increased with increasing number of customers. For example, the wafer manufacturer must gather all the customers' design data, make sure this data comes in at the same time, and interface with customers after the manufacturing process is complete to determine the customers' requirements on final chip selection and packaging. Also, chip selection has become difficult for both customers and engineers because of the need to give each customer manufacturing and process data and help them correlate that data with specific chips to be picked. For example, each set of customer picks must be translated into many industry-standard wafer maps that will be forward to the picking tools. Lastly, each customer has specific requests for processing which cause a drain on engineer time as the engineer must manually edit wafer maps and tool settings to comply with these demands.

The current system has also caused an exponential increase in engineering time and idling time on the tool, as processing a multi-project wafer currently takes as much or more time than processing the equivalent number of single-project wafers. In addition, when customers want to see data for their chips, they must request it from an engineer, who has to prepare the data, filter out other customers' information, and then translate the data into a useful form that the customer can understand. This process does not fit within the on-demand model that the industry would like to adopt.

Accordingly, there exists a need in the art to overcome the deficiencies and limitations described hereinabove.

SUMMARY OF THE INVENTION

In a first aspect of the invention, a method comprises importing a wafer floor plan with chips of different design parameters and importing manufacturing logistical information of the chips. The method further comprises graphically rendering each chip on the wafer to scale within a unit cell using the imported wafer floor plan and the manufacturing logistical information.

In embodiments, the floor plan is imported in an XML format. The floor plan includes chip size and location of every chip relative to a center of the wafer. The manufacturing logistical information includes wafer lot information, chip part number, name, and sort code. The method further comprises importing test data and generating a graphical representation of the test data which has been attached to chip data structures of the chip. The method further comprises generating text data with the graphical rendering. The text data is overlaid on the graphical rendering. The method further comprises sorting the chips based on at least one of: test data; process stripe; ring and quadrant; individual chips; and sitelist. The method further comprises creating an output map or maps that define a user selection of chips. The method further comprises exporting the map or maps into an XML format or a sitelist format. The method further comprises correlating cost information to the sorting of the chips, wherein the cost information is obtained from different value propositions of the sorting. The method further comprises generating maps for user selected chips. The maps are compressed maps or uncompressed maps.

In another aspect of the invention, a method is provided for processing wafer maps for single or multi-project wafers. The method comprises importing a file that represents a floor plan of a wafer and importing logistical and test data. The method further comprises displaying to scale the wafer or a portion thereof along with unit cells (reticles) that have variations in chip sizes therein.

In a further aspect of the invention, a tool comprises a computing infrastructure operable to: display a wafer or a portion thereof along with unit cells (reticles) and chip that it contains, regardless of variations in chip sizes within the reticles, accurately drawn with respect to size and placement of each chip and the reticle in a portion of the wafer being viewed; represent imported test data graphically on the displayed wafer using variation for both discrete and continuous test parameters; group the chips into buckets based on selected bucketing scheme such that each bucket retains information that is common to all of the chips in that bucket; and export bucketed selections to a wafer map.

In another aspect of the invention, a computer program product comprises a computer usable medium having readable program code embodied in the medium. The computer program product includes at least one component to: import a wafer floor plan; import manufacturing logistical information of one or more chips; render each chip on the wafer to scale on a wafer using the wafer floor plan and the manufacturing logistical information; import test and processing data; generate a graphical representation of the test data which has been attached to chip data structures of the chip; allow a user to sort chips; and create an output map or maps that define a user selection of the chips.

BRIEF DESCRIPTION OF THE DRAWINGS

The present invention is described in the detailed description which follows, in reference to the noted plurality of drawings by way of non-limiting examples of exemplary embodiments of the present invention, in which.

DETAILED DESCRIPTION OF EMBODIMENTS OF THE INVENTION

The invention relates to a tool and method to graphically correlate process and test data with specific chips on a multi-project wafer. The tool and method of the present invention is also configured and implemented to select certain sites and export these sites to an industry standard map that can be used in a variety of chip picking or test tools. In implementation, using an XML input file that defines chip metadata and the sizes and locations of each chip on the wafer, the tool can accurately render the wafer, differentiating between the various chips in a multi-project wafer. A plug-in architecture allows the user to connect to different data sources to retrieve manufacturing and test data, which the tool can associate with each chip. In addition, a selection and bucketing mechanism allows for the customer to pick chips, either manually or by intelligent sorting which takes into account the process data for each chip. These selections can be exported to either a sitelist or an industry-standard XML wafer map file which is used as an input to many different semiconductor manufacturing tools.

Figure 1:
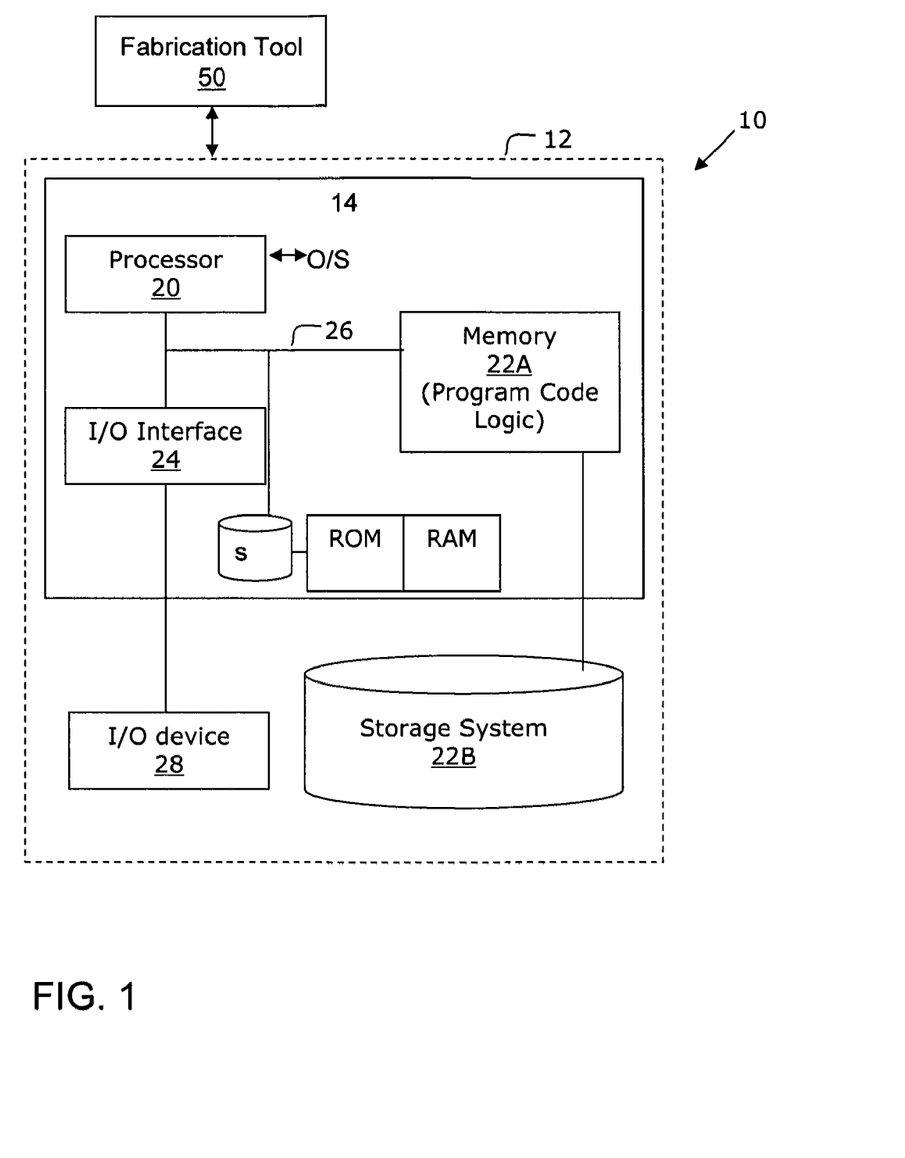
FIG. 1 shows an illustrative tool for implementing the processes in accordance with the invention.

FIG. 1 shows an illustrative tool for implementing the processes in accordance with the invention. Specifically, the tool 10 includes a computer infrastructure 12 that can perform the processes described herein. In particular, the computer infrastructure 12 includes a computing device 14 that comprises computer program logic, which makes the computing device 14 operable to perform the processes described herein, such as, for example, to select certain sites of a wafer and export these sites to an industry standard map that can be used in a variety of chip picking or test tools, as well as providing a scale graphical representation of the wafer or a portion thereof. In implementation, using an XML input file that defines chip metadata and the sizes and locations of each chip on the wafer, the tool can accurately render the wafer, differentiating between the various chips in a multi-project wafer. The tool 10 also includes a plug-in architecture that allows the user to connect to different data sources to retrieve manufacturing and test data, as well as communicate with different tools in a fabrication facility.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, etc.

The processor 20 executes the computer program code which is stored in memory 22A and/or storage system 22B. While executing the computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

While performing the processes described herein, one or more computing devices in the computer infrastructure 12 can communicate with one or more other computing devices external to computer infrastructure 12 using any type of communications link. For example, the computing device can communicate with fabrication tools such as, for example, picking tools, testing tools, etc., generally depicted at reference numeral 50. The communications link can comprise any combination of wired and/or wireless links; any combination of one or more types of networks (e.g., the Internet, a wide area network, a local area network, a virtual private network, etc.); and/or utilize any combination of transmission techniques and protocols.

Exemplary Processes in Accordance with the Invention

FIGS. 2a-5 are flow diagrams showing processes in accordance with the invention. FIGS. 2a-5 may equally represent high-level block diagrams of components of the invention implementing the steps thereof. The steps of FIGS. 2a-5 may be implemented on computer program code in combination with the appropriate hardware and software discussed with reference, for example, to FIG. 1. The computer program code may be stored on storage media or in memory. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Additionally, the computer program code can be transferred to a workstation over the Internet or some other type of network.

In embodiments, a service provider, such as a Solution Integrator, could offer to perform the processes described herein. In this case, a service provider can create, maintain, deploy, support, etc., the tool of FIG. 1 that performs the process steps of the invention for one or more customers. In return, the service provider can receive payment from the customer(s) under a subscription and/or fee agreement.

Figure 2A:
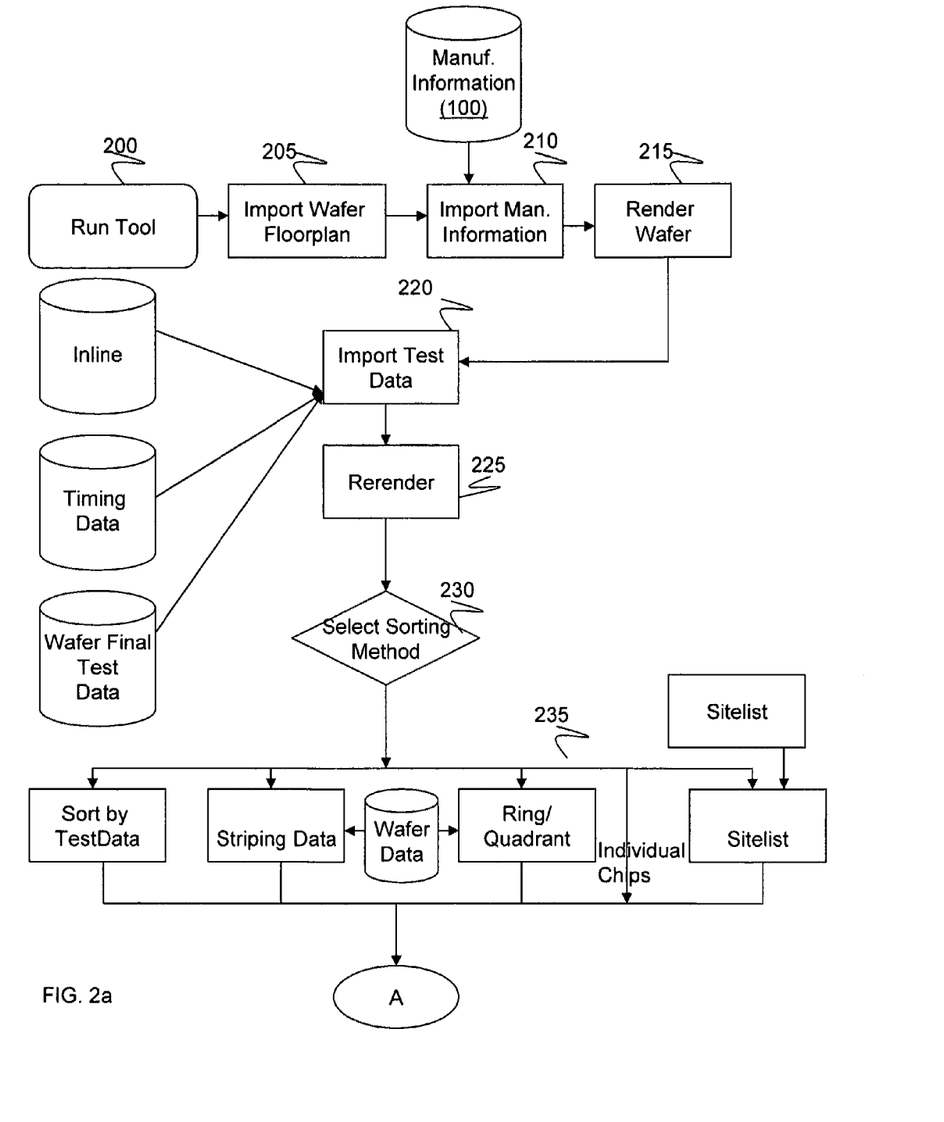
FIGS. 2a and 2b are flow charts implementing processes according to the invention.
Figure 2B:
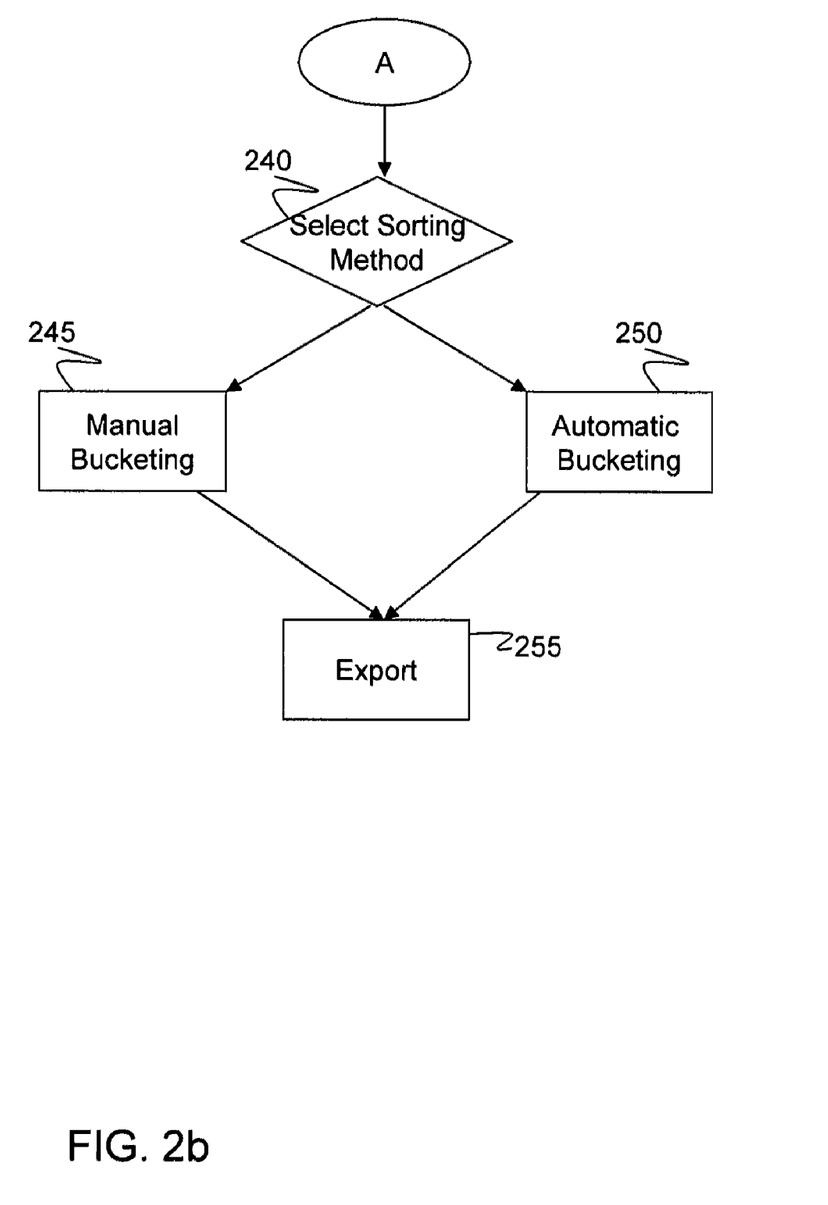

Referring to FIGS. 2a and 2b, in embodiments, the processes in accordance with the invention include six stages. These six stages include:
wafer display stage;
import test data stage;
graphical representation of test data stage;
sorting stage;
selection and bucketing stage; and
export stage.

Figure 6:
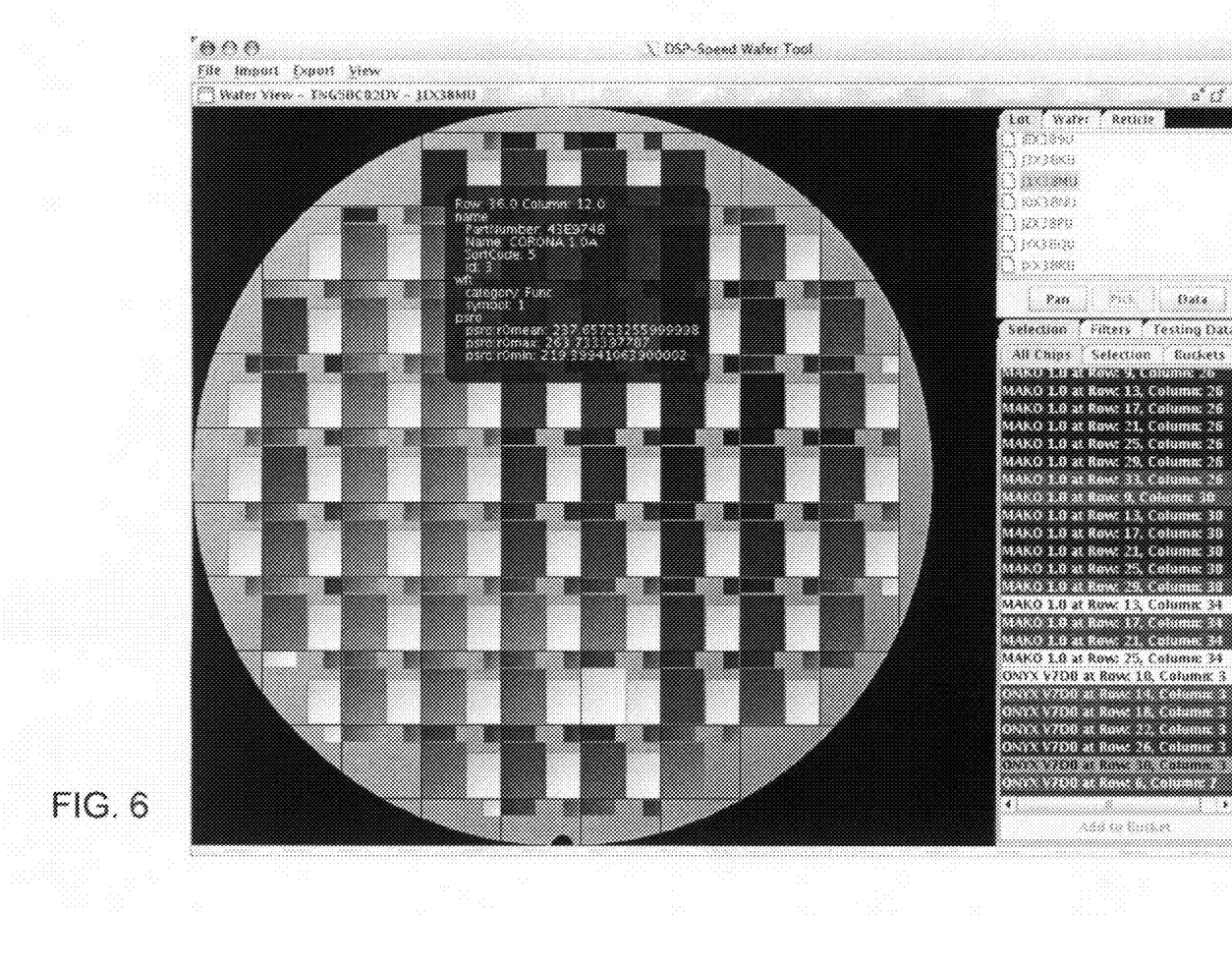
FIGS. 6 and 7 show graphical representations of a wafer as implemented in accordance with aspects of the invention.

In the wafer display stage, at step 200, the user runs the tool. At step 205, the tool imports the wafer floor plan. In embodiments, the floor plan is imported in an XML format. The floor plan can include such data as, for example, chip size, location of every chip relative to a center of the wafer, etc. At step 210, the manufacturing logistical information is imported, preferably from a manufacturing data source. The imported file contains, for example, chip sizes, locations of every chip relative to a center of the wafer, and metadata such as wafer lot information, and each chip's part number, name, and sort code, for example. This information is drawn from various manufacturing logistical databases (100). At step 215, using the location and size, each chip is accurately rendered to scale on the wafer. This rendering can be shown graphically for example, as shown in FIG. 6.

In the import test data stage, at step 220, test data and processing data are imported into the tool from various sources. For example, the test data and processing data may include, without limitation, timing data, wafer final test data and inline electrical data (obtained from, for example, wafer probes and stored in a database accessible to the tool). In embodiments, as the tool has a plug-in architecture, different data importers can be defined. These importers can query any specified data source, e.g., databases, local files, remote servers, etc. The data importers query the data source with specific parameters such as a lot id and wafer id and return the data associated with each chip location. The tool then correlates this data with its internal representation of the wafer and its chip.

Figure 7:
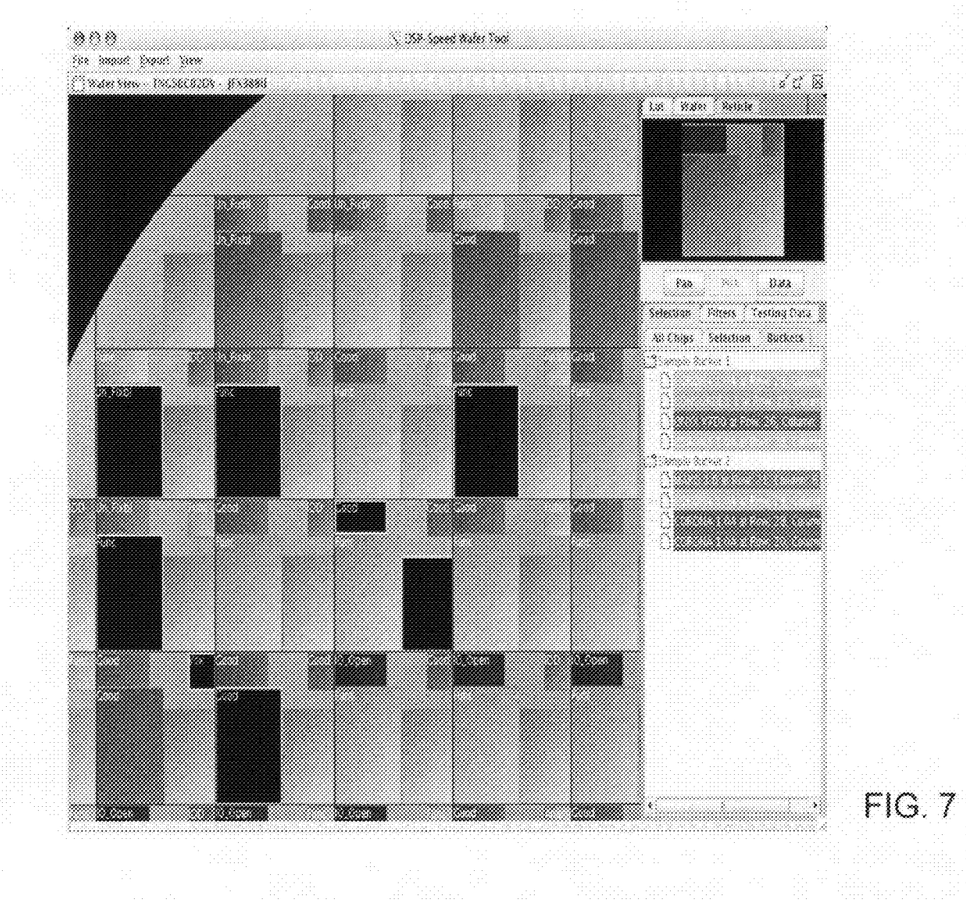

In the graphical representation of test data stage, at step 225, the tool provides a graphical representation of the test data. More specifically, the imported test data, which has been attached to the chip data structures in the tool, can be displayed in a number of ways. For example, when the user moves a cursor over each chip location, an informational panel can be displayed near the cursor location showing all data that is available for that chip (See, FIG. 6). There is also an option to overlay the data on the entire wafer. The tool can overlay a textual representation of the data, or a colorized representation of the specific data parameter, or both text and color, so that variation can be viewed across the entire wafer (FIGS. 6 and 7). For example, if there is a parameter that varies from X to Y, X would be assigned one user-defined color, and Y another user defined color. Then, as the data varies between X and Y the chip with that data would have a corresponding color between the two defined colors.

In the sorting stage, at step 230, the user can select one of many different sorting methods. For example, as shown collectively at step 235, the user can select sorting methods including:
sort by test data;
sort by process stripe;
sort by ring and quadrant;
sort by individual chips; and
sort by sitelist.

It should be recognized by those of skill in the art that the plug-in architecture of the tool could easily allow for extensions that would create new sorting capabilities. As such, the above sorting methodologies are provided for illustration and should not be considered limiting to the invention.

More specific to the above sorting methods, sorting by test data allows the users to choose sorting parameters using the imported test data. For example, the user can choose an upper and lower boundary for the parameter to exclude any chip that they do not want to select. In other examples, the user can filter any chip data including processing speeds, e.g., 3 to 3.5 MHz, chip size, quality of chips, e.g., good chips, etc.

In the sorting by process stripe, during the manufacturing process, different regions of the wafer are exposed to variations in parameters such as gate width, a technique which is called striping. This process is important when trying to "Design for Manufacturing," as customers can see how their chips react to process variation by correlating these stripes with the results of wafer testing. For a customer using the multi-project wafer as a prototyping tool, this feedback is valuable because it allows the design to be adjusted to achieve greater yield when production is increased. As such, in embodiments, the tool is configured to import striping information (from a wafer geography database) and display it on the wafer in addition to the test data, allowing the user to graphically view the correlation.

In ring and quadrant sorting, customers using SiGe technologies are interested in viewing the performance of the chip by wafer ring and quadrant. The tool can pull this geography data from a manufacturing database (a wafer geography database) and display it overlaid on the wafer.

In sorting by Individual chips, customers who want to pick specific chips, or pick all the chips not based on a sorting can do this with traceability to individual chip locations on the wafer. In sitelist sorting, sitelists can be used to identify specific locations which need to be selected and picked. Using an importer (known to those of skill in the art), a sitelist can be displayed on a map, and the chips automatically selected.

In the selection and bucketing stage, by way of an example, some users of the tool will want to select chips and create an output map or maps that define the selection, rather than just viewing the test data. To do so, the user selects specific chips that they want to select, as well as how they will place the chips in different chip bins (buckets) so that the sorting information is retained when the chips are shipped to the customer. In this way, if a customer decides to perform further testing on the chips, they can still correlate previous test or location data with their tests.

In view of the above, at step 240, the user makes a decision as to whether there is to be a manual or automatic selection. In the manual selection, at step 245, a use places any desired chips into user defined buckets. In this manual selection, the user can select chips manually by clicking on the graphical representation of the chip and adding their selections to any user-defined buckets. In the automated process, at step 250, buckets are automatically created based on the sorting mechanism described above. In the automated process, the chips can be automatically bucketed using a method defined by the sorting method selected by the user. For example, if the user sorted by stripe, they may want to place chips from each stripe in separate buckets. Or, when sorting by test data, the user could choose to place chips that failed for different reasons in different buckets, or when sorting on a continuous variable, such as PSRO (Performance Sort Ring Oscillator), choose different ranges which will go in different buckets.

In the export stage, at step 260, the wafer map is exported to a wafer map or sitelist. More specifically, the user can export the map into different formats. In one embodiment, the format is an industry-standard G85 XML map that can be loaded onto many different semiconductor manufacturing tools, such as a chip picker. Another format is a sitelist format which is useful for interfacing with other software tools that do not use the G85 XML format, or quickly sending locations of one chip to customers. Those of skill in the art will recognize, though, that other formats are also contemplated by the invention, including any format that is compatible with other manufacturing tools.

Figure 3:
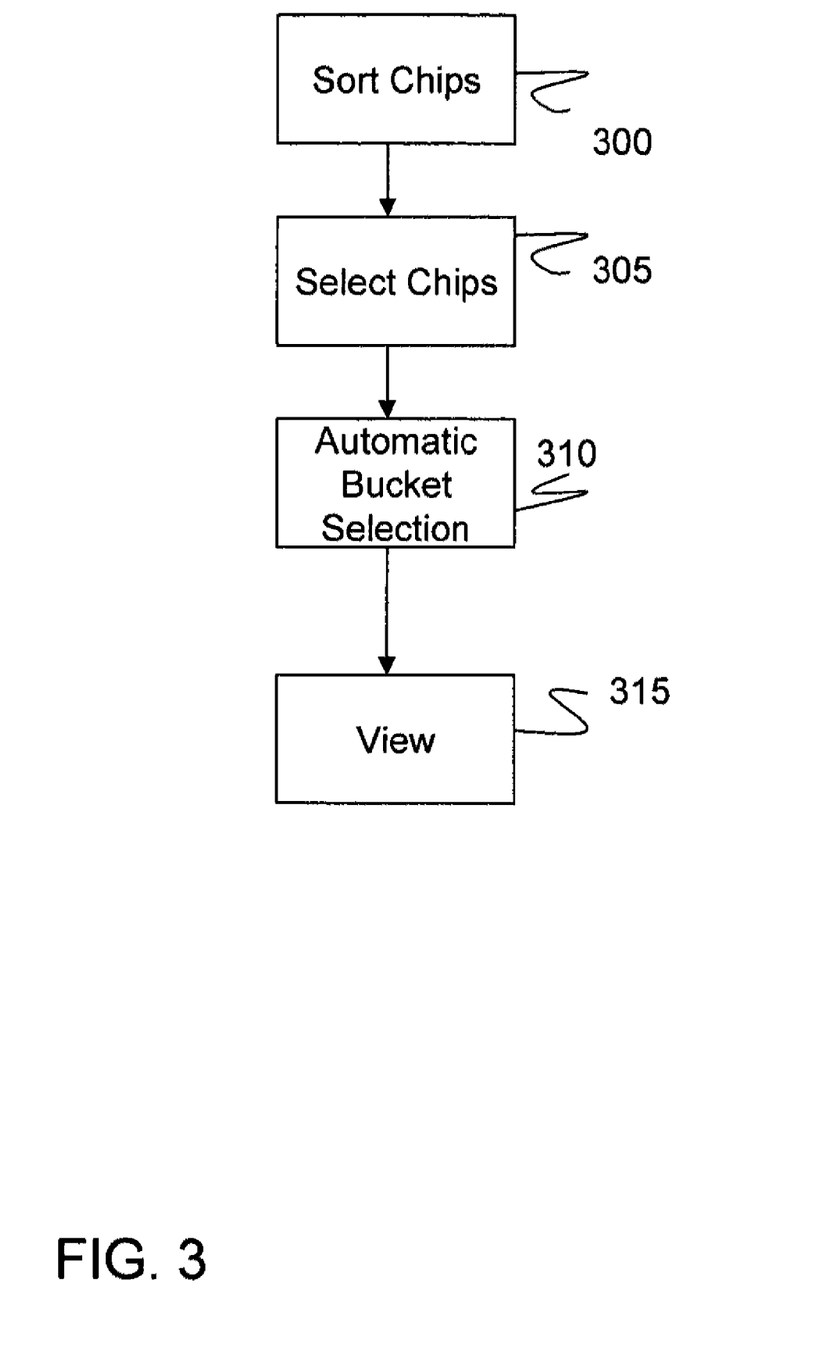
FIG. 3 is a flow chart showing bucketing of chips by cost and turnaround time in accordance with an aspect of the invention.

FIG. 3 is a flow chart showing bucketing of chips by cost and turnaround time in accordance with an aspect of the invention. As the sorting method that the customer selects becomes more granular, more maps must be generated and the picking tool must make more passes, causing an increase in picking price and turnaround time. However, customers can weigh the time vs. cost benefit in accordance with the invention. For example, at step 300, the customer sorts the chips in accordance with methodologies discussed herein. At step 305, the customer selects the chips to be picked by the picking tool. At step 310, the tool provides an automated bucket creation offering different value propositions. For example, using selected chips, the tool can generate all possible bucket options ranging from pick-all to one chip per bucket. In embodiments, the tool can generate compressed map templates for all possible bucket options and the number of the compressed maps can be used to calculate the number of picking passes. At step 315, the customer can view all of the bucketing options with associated cost and time frame in order to make a selection.

Figure 4:
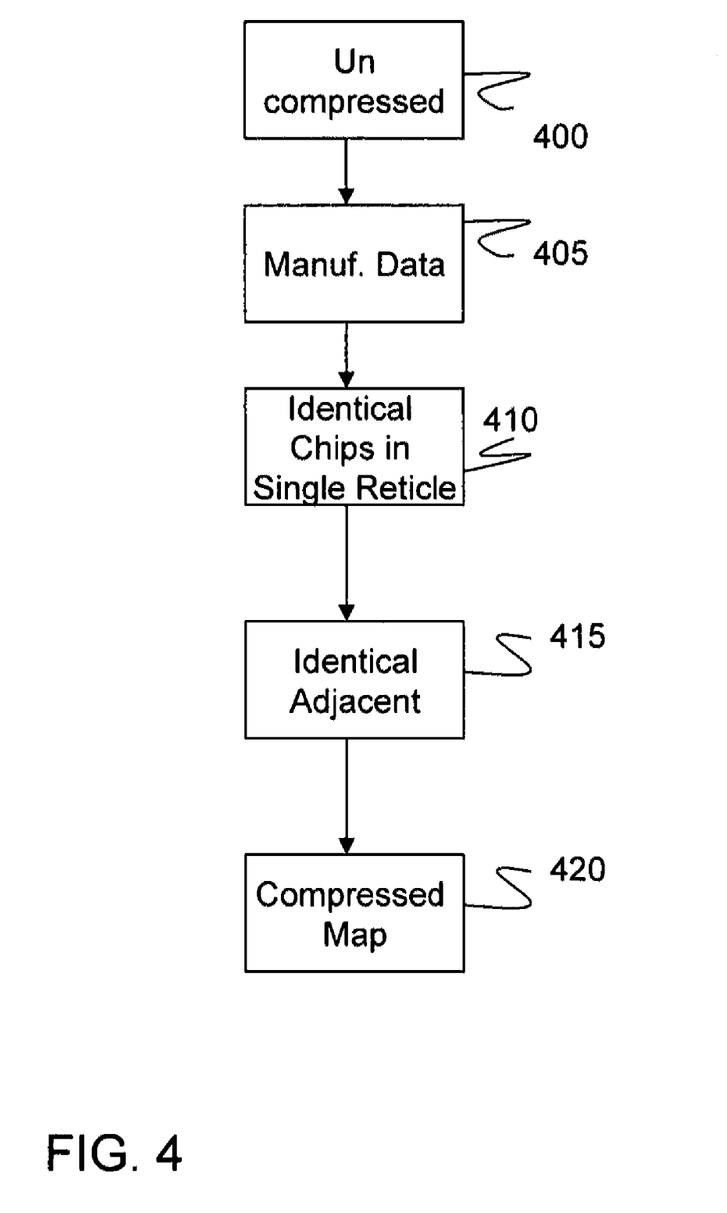
FIG. 4 is a flow chart showing the generation of compressed maps from uncompressed maps.

FIG. 4 is a flow chart showing the generation of compressed maps from uncompressed maps. Tools (e.g., picking, testing, etc.) that are only set up to deal with single project wafers cannot handle "uncompressed" maps that represent multi-project wafers. The uncompressed maps, in these instances, are converted into a set of compressed maps that may appear as a single-project wafer when loaded into the tool. To accomplish this, at step 400, the tool starts with an uncompressed map that represents sites to be tested, picked, etc. on a multi-project wafer. At step 405, using manufacturing logistical data, a determination is made as to which chips have the same image in the reticle (unit cell) (same size and pads). At step 410, a determination is made as to whether any identical chips in a single reticle are laid out in such a manner that they could be placed in the same compressed map. To do so, at step 415, a determination is made as to whether the identical chips are adjacent to one another. If there are more than two identical chips that are adjacent to one another, the tool makes the determination that they form a rectangle. If any chip has an edge against the side of the reticle, the tool makes the determination that all chips (of a same IP) have this same edge against the same side of the reticle. In this manner, identical chips that are differently sized because of dicing are not placed in the same compressed map. At step 415, the tool generates a compressed map for each "group" of chips by removing all other sites from the uncompressed map. The tool can thus distill a multi-project wafer map into multiple single-project wafer maps.

Figure 5:
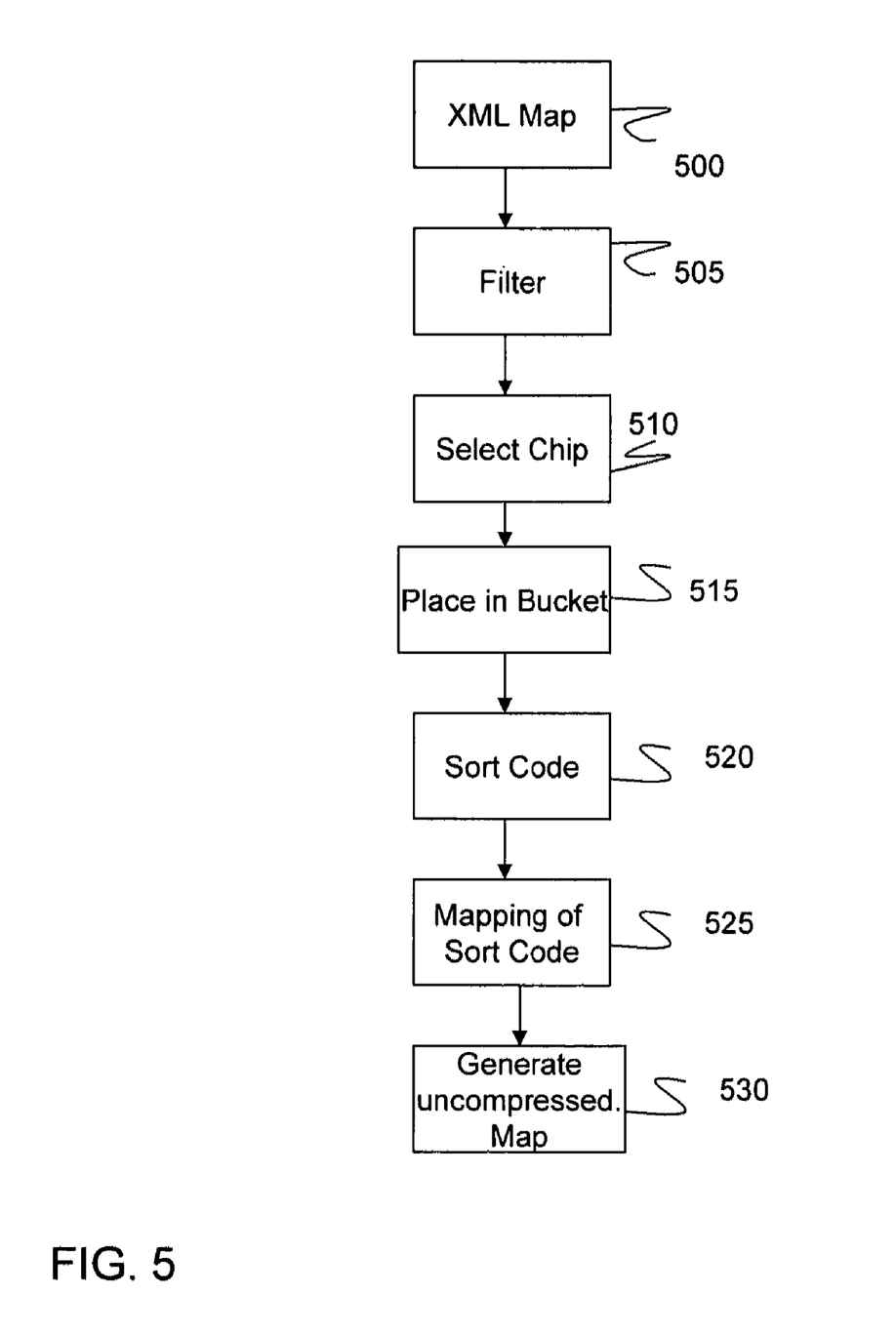
FIG. 5 is a flow chart showing a process of retaining chip sorting information in uncompressed maps.

FIG. 5 is a flow chart showing a process of retaining chip sorting information in uncompressed maps. A wafer map specifies the location of each chip on the wafer. For multi-project wafers, each chip is assigned a different number. When generating an uncompressed map to be used for the picking tool, for example, these numbers can be reassigned to represent different sort categories instead of different chips. This allows sorting information to be retained throughout the picking process.

By way of illustration, at step 500, the tool starts with an XML map representing all of the pickable sides on the wafer. At step 505, the customer filters the chips based on specific search criteria which can include, for example, test data or process data. At step 510, the customer selects specific chips to be picked from the filtered wafer. At step 515, the customer places the chips into a bucket. Each bucket contains a set of chips that has commonality which the customer wishes to retain knowledge of for further analysis. At step 525, a unique "sort code" is assigned to each bucket. In embodiments, the sort code can range from 1 to 254; although, other sort codes are also contemplated by the invention. At step 525, the tool places a mapping of the sort code to bucket description in the header. At step 530, the uncompressed template is then generated by the tool, with each location containing the sort code of the bucket that the chip at that location should be placed.

Graphical Representations

FIGS. 6 and 7 show graphical representations generated in accordance with aspects of the invention. Specifically, FIG. 6 graphically shows text and color overlay of a discrete variable (wafer final test sort) and bucketing capability. The text can be any pertinent test data of the wafer including, for example, processing parameters for a particle chip, etc. Also, the text can be overlaid on the graphical representation of the wafer, which includes many different discrete chips. FIG. 6 also demonstrates the ability to zoom the wafer, and to view both the wafer and an individual reticle or chip. The chips can be representative of different sizes, different customer IP, etc.

FIG. 7 represents a colorized representation (shown as a grayscale representation) of specific data parameters so that variation can be viewed across the entire wafer. For example, FIG. 7 graphically shows user-defined colors representing good and bad chips.

While the invention has been described in terms of exemplary embodiments, those skilled in the art will recognize that the invention can be practiced with modifications and in the spirit and scope of the appended claims.

It is claimed:
1. A method comprising:
  importing a wafer floor plan with chips of different design parameters;
  importing manufacturing logistical information of the chips;
  graphically rendering each chip on the wafer to scale within a unit cell using the imported wafer floor plan and the manufacturing logistical information; and
  importing test data and processing data comprising at least one of timing data, wafer final test data and inline electrical data, and generating a graphical representation of the test data which has been attached to chip data structures of the chip.

2. The method of claim 1, wherein the floor plan is imported in an XML format.

3. The method of claim 1, wherein the floor plan includes chip size and location of every chip relative to a center of the wafer.

4. The method of claim 1, wherein the manufacturing logistical information includes wafer lot information, chip part number, name, and sort code.

5. The method of claim 1, further comprising generating text data with the graphical rendering.

6. The method of claim 5, wherein the text data is overlaid on the graphical rendering.

7. The method of claim 1, further comprising sorting the chips based on at least one of: test data; process stripe; ring and quadrant; individual chips; and sitelist.

8. The method of claim 7, further comprising creating an output map or maps that define a user selection of chips.

9. The method of claim 8, further comprising exporting the map or maps into an XML format or a sitelist format.

10. The method of claim 1, wherein the test data and processing data is received from a plurality of different data sources.

11. A method comprising:
importing a wafer floor plan with chips of different design parameters;
importing manufacturing logistical information of the chips;
graphically rendering each chip on the wafer to scale within a unit cell using the imported wafer floor plan and the manufacturing logistical information; and
correlating cost information to the sorting of the chips, wherein the cost information is obtained from different value propositions of the sorting.

12. The method of claim 1, further comprising generating maps for user selected chips.

13. The method of claim 12, wherein the maps are compressed maps.

14. The method of claim 11, further comprising generating maps for user selected chips, wherein the maps are compressed maps.

15. A method of processing wafer maps for single or multi-project wafers comprising:
importing a file that represents a floor plan of a wafer;
importing logistical and test data;
displaying to scale the wafer or a portion thereof along with unit cells that have variations in chip sizes therein;
importing test data and process data of a chip on the wafer;
correlating the imported test data and process data with internal data structure representations of the chip on the wafer; and
representing the imported test data graphically.

16. The method of claim 15, wherein the importing logistical and test data is by use of a plug in architecture.

17. The method of claim 15, wherein the scale is with respect to size and placement of each chip and reticle in the portion of the wafer being viewed.

18. The method of claim 15, further comprising sorting chips based on one or more parameters.

19. The method of claim 15, further comprising displaying cost and turnaround time associated with bucketing schemes of sorted chips.

20. The method of claim 15, further comprising grouping chips into buckets based on chosen bucketing schemes such that each bucket retains information that is common to all of the chips in the bucket.

21. The method of claim 15, further comprising exporting bucketed selections to a multi-project wafer map and distilling the multi-project wafer map into multiple single wafer maps.

22. A tool comprising a computing infrastructure which:
displays a wafer or a portion thereof along with reticles and chip that it contains, regardless of variations in chip sizes within the reticles, accurately drawn with respect to size and placement of each chip and the reticle in a portion of the wafer being viewed;
represents imported test data graphically on the displayed wafer using variation for both discrete and continuous test parameters;
groups the chips into buckets based on selected bucketing scheme such that each bucket retains information that is common to all of the chips in that bucket; and
exports bucketed selections to a wafer map.

23. The tool of claim 22, wherein the computing infrastructure is operable to distill a multi-project wafer map into multiple single-project wafer maps.

24. The tool of claim 22, wherein the computing infrastructure is operable to display cost and turnaround time associated with each bucketing scheme.

25. The tool of claim 22, wherein the computing infrastructure is operable to import test and processing data comprising at least one of timing data, wafer final test data and inline electrical data and generate a graphical representation of the test data which has been attached to chip data structures of the chip.

26. A computer program product comprising a tangible computer usable storage medium having readable program code embodied in the storage medium, the computer program product includes at least one component to:
import a wafer floor plan;
import manufacturing logistical information of one or more chips;
render each chip on the wafer to scale on a wafer using the wafer floor plan and the manufacturing logistical information;
import test and processing data comprising at least one of timing data, wafer final test data and inline electrical data;
generate a graphical representation of the test data which has been attached to chip data structures of the chip;
allow a user to sort chips; and
create an output map or maps that define a user selection of the chips.

* * * * *